(12) United States Patent
Prasky et al.

(10) Patent No.: US 8,176,406 B2
(45) Date of Patent: May 8, 2012

(54) HARD ERROR DETECTION

(75) Inventors: Brian R. Prasky, Wappingers Falls, NY (US); Khary J. Alexander, Poughkeepsie, NY (US); James J. Bonanno, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/051,367

(22) Filed: Mar. 19, 2008

(65) Prior Publication Data

US 2009/0240977 A1 Sep. 24, 2009

(51) Int. Cl.
*G06F 7/02* (2006.01)

(52) U.S. Cl. .................................................. 714/819
(58) Field of Classification Search .............. 714/48, 714/54
See application file for complete search history.

(56) References Cited

U.S. PATENT DOCUMENTS

| | | | | |
|---|---|---|---|---|
| 5,303,166 | A * | 4/1994 | Amalfitano et al. | 702/186 |
| 5,461,588 | A * | 10/1995 | Sardeson et al. | 365/201 |
| 5,499,147 | A * | 3/1996 | Tsai et al. | 360/53 |
| 5,815,509 | A * | 9/1998 | Deng et al. | 714/719 |
| 6,571,363 | B1 | 5/2003 | Steiss | |
| 6,751,749 | B2 | 6/2004 | Hofstee et al. | |
| 7,320,096 | B2 * | 1/2008 | Tsao | 714/718 |
| 7,526,702 | B2 * | 4/2009 | Soetemans | 714/735 |
| 7,603,596 | B2 * | 10/2009 | Cha et al. | 714/718 |
| 7,954,020 | B2 * | 5/2011 | Yoshihara | 714/719 |
| 7,971,117 | B2 * | 6/2011 | Lee et al. | 714/736 |
| 8,020,054 | B2 * | 9/2011 | Sakai | 714/718 |
| 2002/0116672 | A1 * | 8/2002 | Kanzaki | 714/718 |
| 2003/0177435 | A1 * | 9/2003 | Budd et al. | 714/776 |
| 2004/0205429 | A1 * | 10/2004 | Yoshida et al. | 714/718 |
| 2005/0283688 | A1 * | 12/2005 | Bao et al. | 714/718 |
| 2006/0101369 | A1 | 5/2006 | Wang et al. | |
| 2006/0179257 | A1 | 8/2006 | Chu et al. | |
| 2007/0011510 | A1 * | 1/2007 | Hartmann | 714/718 |
| 2007/0041262 | A1 | 2/2007 | Goel | |
| 2007/0106878 | A1 | 5/2007 | Nguyen et al. | |
| 2008/0016324 | A1 | 1/2008 | Burkey et al. | |
| 2008/0022044 | A1 | 1/2008 | Nunamaker et al. | |
| 2008/0320376 | A1 * | 12/2008 | Unno | 714/819 |
| 2009/0077417 | A1 * | 3/2009 | Hildebrand | 714/15 |
| 2009/0132874 | A1 * | 5/2009 | Randell | 714/719 |
| 2009/0213487 | A1 * | 8/2009 | Luan et al. | 360/77.04 |
| 2009/0228744 | A1 * | 9/2009 | Deenadhayalan et al. | 714/48 |
| 2009/0282305 | A1 * | 11/2009 | Chen et al. | 714/718 |

OTHER PUBLICATIONS

"IBM® z/Architecture Principles of Operation", Publication No. SA22-7832-05, 6th Edition, Apr. 2007. 1,215 pages separated into 4 electronic attachments.

(Continued)

*Primary Examiner* — Philip Guyton
*Assistant Examiner* — Neil Miles
(74) *Attorney, Agent, or Firm* — Cantor Colburn LLP; John Campbell

(57) ABSTRACT

An error detection system is provided. The system includes a data array that includes one or more data entries. A copy datastore selectively stores a copy of a first single data entry of the data array. An index generator selectively increments an index that references the data array. A first comparator compares the copy with a second single data entry from the data array based on the index. An error generator generates an error signal based on a result from the first comparator.

15 Claims, 4 Drawing Sheets

OTHER PUBLICATIONS

"ADL/µADL: A Comprehensive Microprocessor Modeling Framework", Hangsheng Wang, Brian Kahne, Freescale Semiconductor, Sep. 24, 2007, Power Architecture Developer Conference '07. 46 pages.

"Hardware/Software Instruction Set Configurability for System-On-Chip Processors", A. Wang, E. Killian, D. Maydan, C. Rowen; Design Automation Conference. Jun. 2001, Las Vegas, Nevada. 5 pages.

* cited by examiner

HARD ERROR DETECTION

BACKGROUND OF THE INVENTION

This invention relates generally to memory error detection systems for computing systems, and more particularly to memory error detection systems that provide array entry duplication for hard error detection.

High performance microprocessors typically include logic to improve performance. In one example, microprocessors include a branch history table (BHT) that stores a direction history of recently encountered branch instructions. Many processors also include a Branch Target Buffer (BTB) that stores branch address and target address bits associated with the given branch. The BHT and the BTB are used by prediction logic to predict the direction (take vs. not taken) and the target address of the branch instruction. The BHT and BTB are implemented as either a register file or an array.

At least two types of errors can occur in these performance related register files or arrays. A soft error is a seemingly random inversion of stored data. This inversion may be caused by occasional electrical noise, environmental conditions and, in some cases, by bombardment of radioactive particles, the so-called alpha-particle event. In contrast, a hard error represents a permanent electrical failure of the memory array, often restricted to a particular memory location but may also sometimes be associated with peripheral circuitry of the memory array so that the entire array can be affected.

Unlike most arrays on the microprocessor, it is possible for there to be an error in the performance array and the error goes unnoticed. For example, the error from a BHT can simply look like a "bad prediction." A "bad prediction" is a natural occurring event because it is only a prediction and hence is handled in the microprocessor through means to compare a prediction versus an actual outcome and take appropriate measures should the prediction be incorrect.

Conventional methods of detecting such errors include implementing ECC/parity bits in the array to allow for an ECC/parity check upon reading the data content out. A parity bit on the index can also be stored within the array to verify the content read out correlates with the entry which was indexed.

Depending on the size of the array or register files, these additional bits per entry can significantly increase memory usage. It would be desirable to be able to detect errors within the performance enhancing arrays or register files while minimizing memory usage.

BRIEF SUMMARY OF THE INVENTION

An exemplary embodiment includes an error detection system. The system includes a data array that includes one or more data entries. A copy datastore selectively stores a copy of a first single data entry of the data array. An index generator selectively increments an index that references the data array. A first comparator compares the copy with a second single data entry from the data array based on the index. An error generator generates an error signal based on a result from the first comparator.

Another exemplary embodiment includes an error detection method. The method includes: selectively storing a copy of a first single data entry of a data array; selectively incrementing an index that references the data array; comparing the copy with a second single data entry from the data array based on the index; and generating an error signal based on a result of the comparing.

A further exemplary embodiment includes a computer program product for detecting errors. The computer program product includes a computer-readable storage medium that stores instructions for executing error detection. The error detection includes a method of: selectively storing a copy of a first single data entry of a data array; selectively incrementing an index that references the data array; comparing the copy with a second single data entry from the data array based on the index; and generating an error signal based on a result of the comparing.

Additional features and advantages are realized through the techniques of the present invention. Other embodiments and aspects of the invention are described in detail herein and are considered part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides maintaining a side copy of a single entry of the register file or array. The side copy references different register file or array entries over time. In addition to the side copy of the single entry of the register file or array, an address/index referencing the location of the entry to which the copy relates is also maintained. Whenever an entry is read from the register file or array that is also maintained within the duplicate copy, the output of the register file or array is cross compared to the contents of the duplicate copy. This provides checking on both the data content and the indexing structure of the register file or array.

Such means are not only more cost effective but provide higher coverage in respect to the specific data that is being checked in a given time frame. In such cases, it is not necessary to detect that something has gone wrong as soon as it goes wrong, but to detect it over time. This is ideal for hard failures where the impact to the register file or array yields a decrease to performance. While not an impact to data integrity, once the error is detected, the processor is taken off line to spare in another processor to provide the performance that is required of the specified microprocessor.

Figure 1:
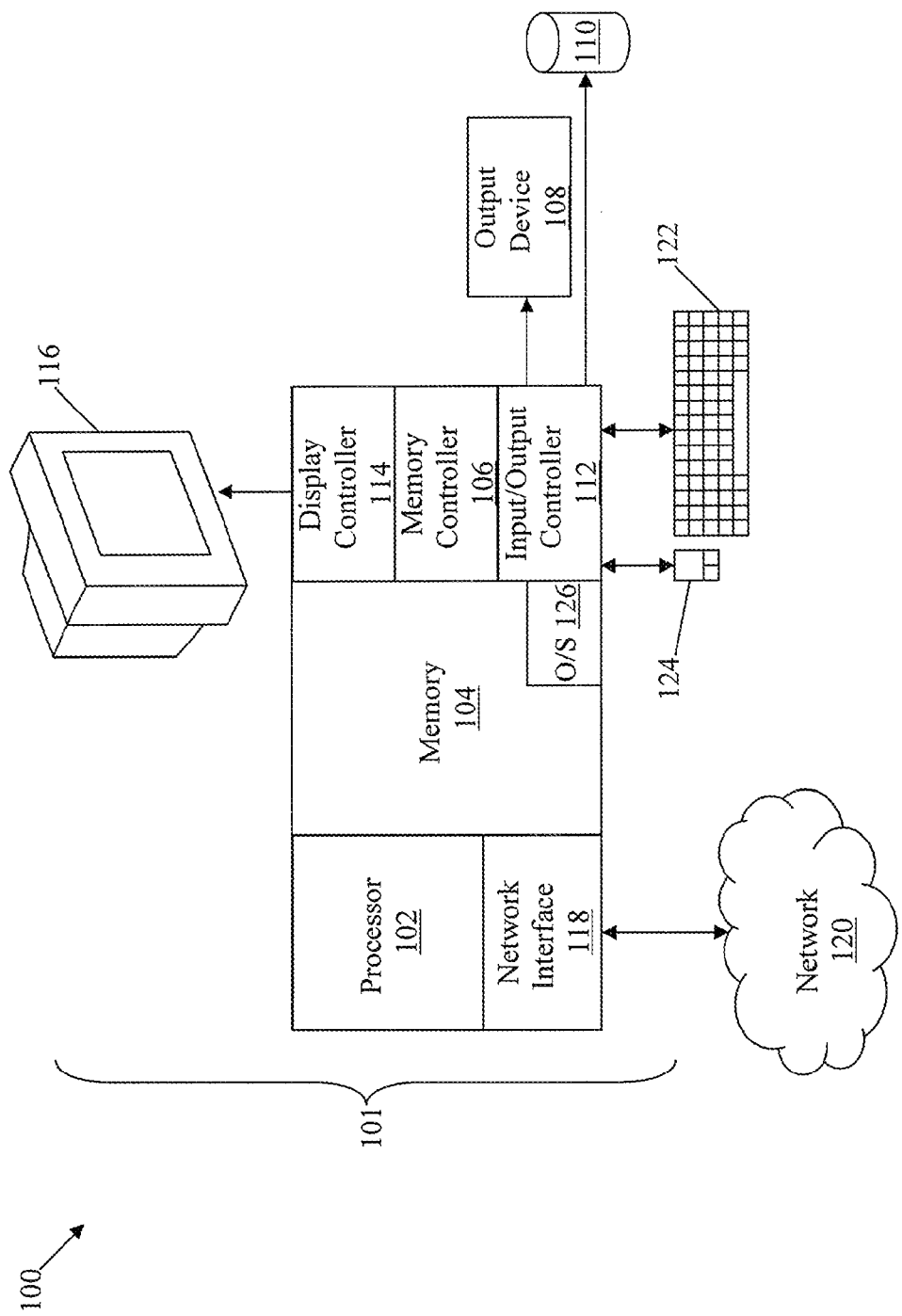
FIG. 1 is a functional block diagram illustrating a computing system that includes a hard error detection system according to various aspects of the present disclosure.

Turning now to FIG. 1, a block diagram illustrates an exemplary computing system 100 that includes a hard error detection system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, the system 100 can further include a network interface 118 for coupling to a network 120. The network 120 transmits and receives data between the computer 101 and external systems. In an exemplary embodiment, a conventional keyboard 122 and mouse 124 can be coupled to the input/output controller 112.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 102 includes the hard error detection systems and methods as described herein.

Figure 2:
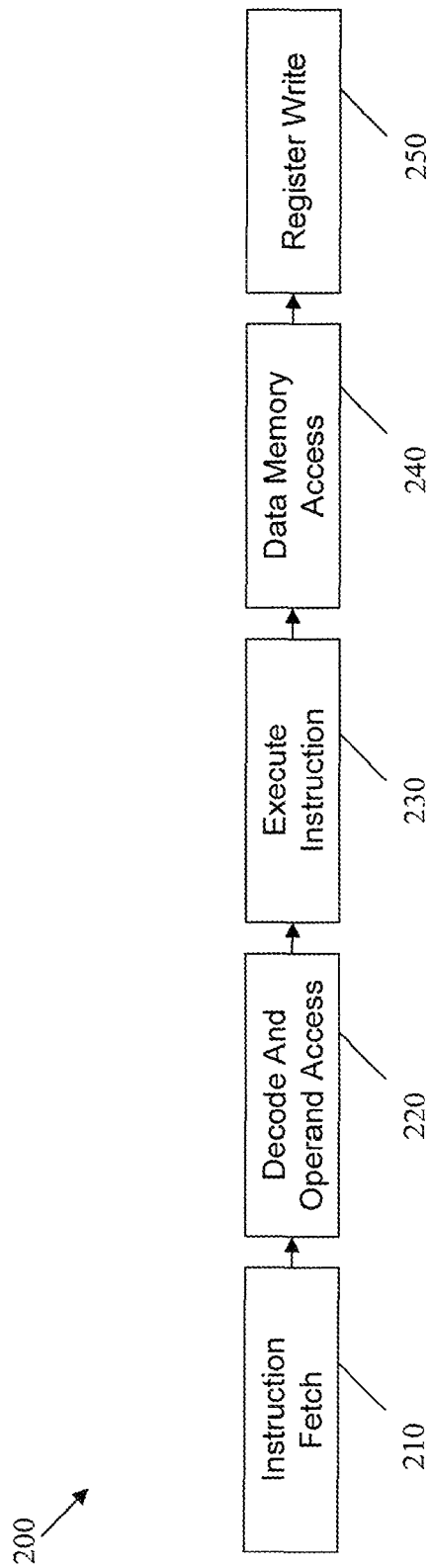
FIG. 2 is a functional block diagram illustrating a pipeline of a processor of the computing system according to various aspects of the present disclosure.

FIG. 2 illustrates a block diagram of a processor instruction pipeline system 200 in which the hard error detection methods can be implemented in accordance with an exemplary embodiment. One way to speed up processor operation is to implement a pipeline structure. Pipelining is one specific form of parallelism, where the execution of several instructions can be interleaved on the same hardware.

In an exemplary embodiment, the pipeline system includes five stages: an instruction fetch stage 210, a decode and operand access stage 220, an execute instruction stage 230, a data memory access stage 240, and a register write stage 250. In an exemplary embodiment, the instruction fetch stage 210 fetches instructions to be processed. The decode and operand access stage 220 decodes the instruction and gathers the source operands needed by the instruction being processed. The execute instruction stage 230 performs the function of the instructions that can include arithmetic logic unit (ALU) operations. The data memory access stage 240 performs any data memory access functions associated with the instruction. The register write stage 250 writes the appropriate result value into the register file or array.

Figure 3:
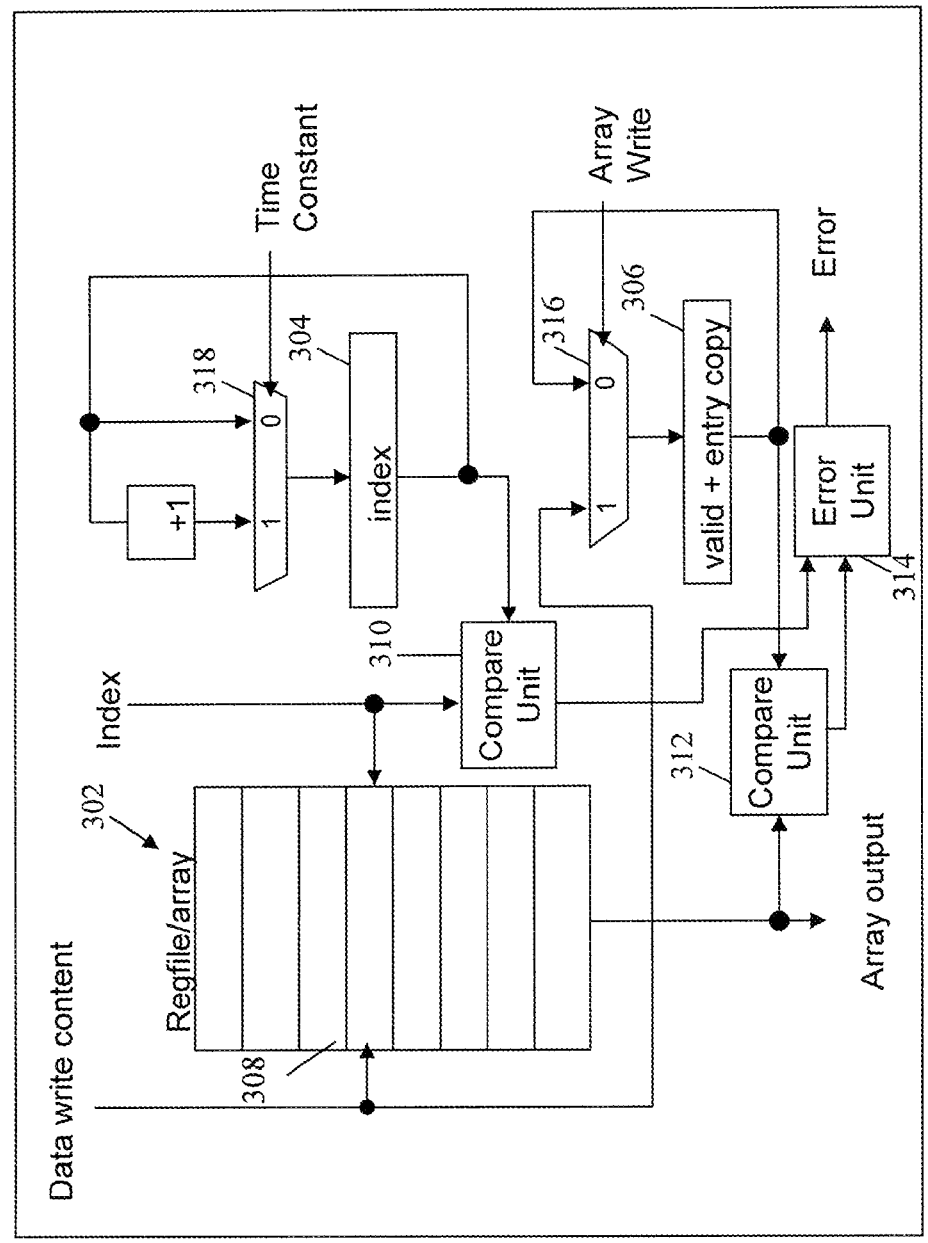
FIG. 3 is a block diagram illustrating the hard error detection system of the pipeline according to various aspects of the present disclosure.

Turning now to FIG. 3, an error detection stage 300 of the pipeline 200 is illustrated that includes the hard error detection methods and systems in accordance with an exemplary embodiment. In various embodiments, the error detection stage 300 can be implemented after or as a part of the data memory access stage 240 and/or the register write stage 250. As can be appreciated, the error detection stage 300 can be implemented in other stages of the pipeline 200.

The hard error detection system is shown to include memory storage elements, such as, a register file or data array (hereinafter referred to as a data array 302), a side copy index 304, and a side copy data entry 306. The data array 302 stores performance data including, but not limited to, branch history table data. The data array 302 is accessed via read and/or write operations of the processor 102 (FIG. 1). The side copy data entry 306 stores a copy of the performance data stored in a single entry 308 of the data array 302 combined with a valid bit. The performance data is combined with the valid bit via a first multiplexer 316. The side copy index stores a current index into the data array 302. The current index can be initialized to a particular value and updated, for example, by incrementing the value per a given time constant via a second multiplexer 318.

The hard error detection system is further shown to include a first comparator 310, a second comparator 312, and an error unit 314. As will be discussed in more detail below, the first comparator 310 compares the current index to either a destination of a write operation, or a location of a read operation. The second comparator 312, so long as the valid bit indicates that the performance data is valid, compares the performance data read from the data array 302 with the performance data stored in the side copy data entry 306. The error unit 314 performs a logical and on the output of the first comparator 310 and the output of the second comparator 312 to determine an error output.

In one example, the hard error detection system functions as follows. Upon receiving a write operation associated with the data array 302, the destination of the write operation is compared with the index via the first comparator 310. If the destination and index are the same, the data write performance data is stored in an associated entry 308 of the data array 302 and the same data write performance data along with the valid bit indicating valid (e.g., one) is copied to the side copy data entry 306.

Upon receiving a read operation associated with the data array 302, the read location of the read operation is compared with the index by the first comparator 310. If the read location and the index are the same, the data read performance data is read from the data array 302 and compared with the performance data stored in the side copy data entry 306 via the second comparator 312. The error unit 314 receives as input the output of the first and the second comparators 310, 312 respectively and performs a functional and. The result of the error unit 314 indicates whether a hard error has been determined for the current index of the data array 302. For example, if the error unit 314 generates a one, an error has been detected. If the error unit 314 generates a zero, an error has not been detected.

Meanwhile, the index stored in the side copy index 304 is updated based on a time constant. When the index is updated, the valid bit stored in the side copy data entry 306 is set to indicate invalid (e.g., zero).

Figure 4:
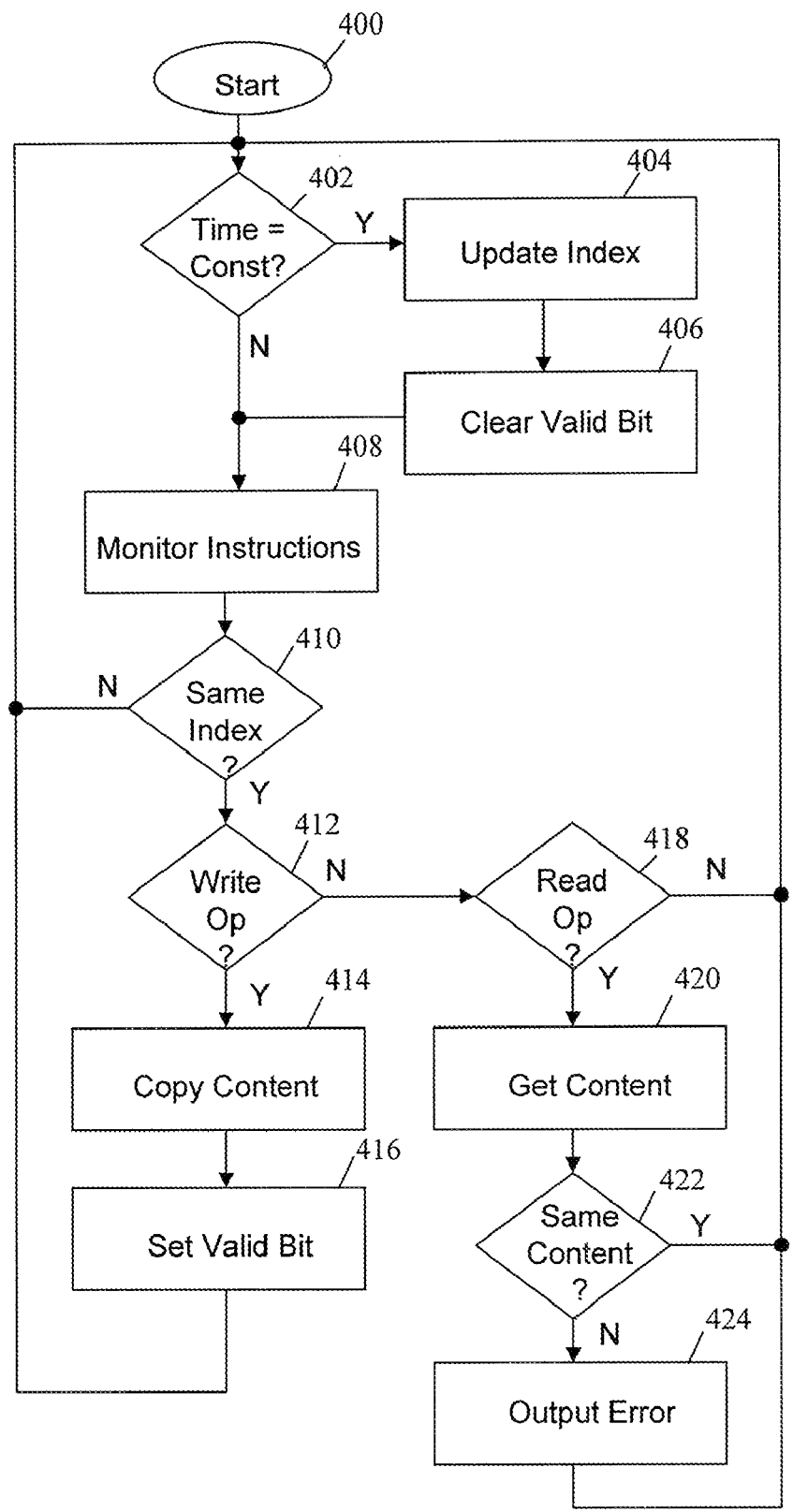
FIG. 4 is a flowchart illustrating a hard error detection method that can be performed by the hard error detection system according to various aspects of the present disclosure.

Turning now to FIG. 4, a flowchart illustrates a hard error detection method in accordance with an exemplary embodiment. As can be appreciated in light of the disclosure, the order of operation within the method is not limited to the sequential execution as illustrated in FIG. 4, but may be performed in one or more varying orders as applicable and in accordance with the present disclosure. In various embodiments, the method may be scheduled to run based on certain events and/or scheduled to run continually during processor operation. As shown in the example of FIG. 4, the method is run continually during processor operation and only exits when processor operation ceases.

In one example, the method may begin at 400. The time is evaluated at 402. If the time does not equal the time constant at 402, the processor instructions are monitored at 408. However, if the time equals the time constant at 402, the side copy index is incremented at 404 and the valid bit is set to zero at 406.

If the instruction contains a reference to the data array, the index is evaluated at 410. If the reference is equal to the index at 410 the instruction is evaluated for the instruction type at 412 and 418. Otherwise, if the reference does not match the index at 410, the method loops back to evaluate the time at 402.

If, at 412, the processor instruction includes a write operation, the same performance data that is written to the data array is copied to the side copy data entry at 414 and the side copy valid bit is set to one at 416. Thereafter, the method loops back to evaluate the time at 402.

If, at 412, the processor instruction does not include a write operation, rather the processor instruction includes a read operation at 418, the performance data of the data array is read at 420 and compared to the performance data stored in the side copy data entry at 422. If the performance data from the data array and the performance data stored in the side copy data entry are not the same at 422, an error signal is output at 424. Otherwise, if the performance data of the data array and the performance data stored in the side copy data entry are the same at 422, the method loops back to evaluate the time at 402.

If, at 412, the processor instruction does not include a write operation and, at 418, the processor instruction does not include a read operation, the method loops back to evaluate the time at 402.

Technical effects and benefits include: providing higher coverage of specific data that is being checked in a given time frame; and providing cost effective measures for performing the data check; and allows for, once the error is detected, the processor to be taken off line to spare in another processor to provide the expected performance or to delete a portion of the array.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. An error detection system, the system comprising:
   a data array that includes one or more data entries;
   a copy datastore that selectively stores a copy of a first single data entry of the data array based on a first index and that selectively stores a valid bit indicating a validity of the copy;
   an index generator that selectively increments a second index that is associated with the first index that references the data array;
   a first comparator that compares the copy with the first single data entry from the data array based on the first index and based on the valid bit indicating valid; and
   an error generator that generates an error signal based on a result from the first comparator.

2. The system of claim 1 wherein the data array stores performance data of a processor.

3. The system of claim 1 wherein the copy datastore selectively stores the copy based on a write operation of a processor.

4. The system of claim 1 wherein the index generator increments the second index based on a time constant.

5. The system of claim 1 further comprising a second comparator that compares the first index that references the data array with the second index.

6. The system of claim 5 wherein the first comparator compares the copy with the first single data entry based on a result from the second comparator.

7. The system of claim 1 wherein the valid bit is set to indicate valid when the copy datastore stores the copy.

8. The system of claim 1 wherein the valid bit is set to indicate invalid when the second index is incremented.

9. An error detection method, the method comprising:
   selectively storing a copy of a first single data entry of a data array based on a first index;
   selectively storing a valid bit indicating a validity of the copy;
   selectively incrementing a second index that is associated with the first index that references the data array;
   comparing the copy with the first single data entry from the data array based on the first index and based on the valid bit indicating valid; and
   generating an error signal based on a result of the comparing.

10. The method of claim 9 wherein the selectively storing the copy is based on a write operation of a processor.

11. The method of claim 9 wherein the selectively incrementing the second index is based on a time constant.

12. The method of claim 9 further comprising comparing the index that references the data array with the second index and wherein the comparing the copy is based on a result of the comparing the first and second indexes.

13. The method of claim 9 further comprising setting the valid bit to indicate valid upon the storing of the copy of the first single data entry.

14. The method of claim 9 further comprising setting the valid bit to indicate invalid upon the incrementing of the second index.

15. A computer program product for detecting errors, the computer program product comprising:
a non-transitory computer-readable storage medium that stores instructions for executing error detection, the error detection comprising a method of:
selectively storing a copy of a first single data entry of a data array based on a first index;
selectively storing a valid bit indicating a validity of the copy;
selectively incrementing a second index that is associated with the first index that references the data array;
comparing the copy with the first single data entry from the data array based on the first index and based on the valid bit indicating valid; and
generating an error signal based on a result of the comparing.

* * * * *